United States Patent [19]
Humphrey

[11] 3,944,325
[45]*Mar. 16, 1976

[54] SEMI-LIQUID STABILIZED OPTICES

[75] Inventor: William E. Humphrey, Oakland, Calif.

[73] Assignee: Optical Research and Development Corporation, Berkeley, Calif.

[ * ] Notice: The portion of the term of this patent subsequent to Jan. 16, 1990, has been disclaimed.

[22] Filed: Apr. 29, 1974

[21] Appl. No.: 465,044

Related U.S. Application Data

[63] Continuation of Ser. No. 237,397, March 23, 1972, abandoned.

[52] U.S. Cl.................................. 350/16; 350/179
[51] Int. Cl.² ...................... G02B 23/14; G02B 3/12
[58] Field of Search .............................. 350/16, 179

[56] References Cited
UNITED STATES PATENTS

| | | | |
|---|---|---|---|
| 3,532,409 | 10/1970 | Humphrey | 350/16 |
| 3,620,594 | 11/1971 | Humphrey | 350/16 |
| 3,672,473 | 6/1972 | Verhagen | 350/16 X |
| 3,711,178 | 1/1973 | Humphrey | 350/16 |

*Primary Examiner*—David H. Rubin
*Attorney, Agent, or Firm*—Townsend and Townsend

[57] ABSTRACT

Optics are stabilized by suspending an optical element in a semi-liquid, either freely or by supports allowing for substantial freedom of movement. The semi-liquid provides support for the optical element, damping of oscillation and minimal distortions resulting from inhomogeneous adsorption of heat by the fluid media.

17 Claims, 3 Drawing Figures

U.S. Patent   March 16, 1976   3,944,325
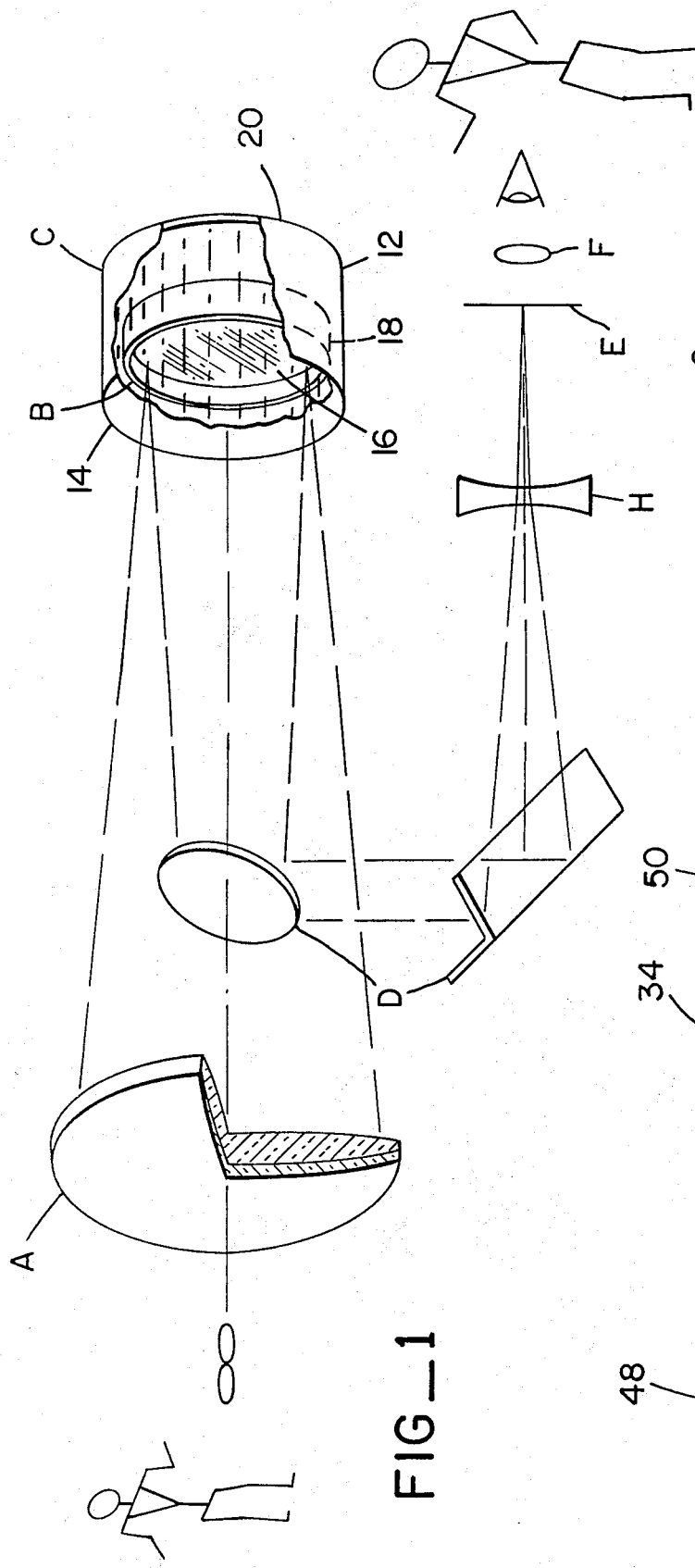
FIG_1
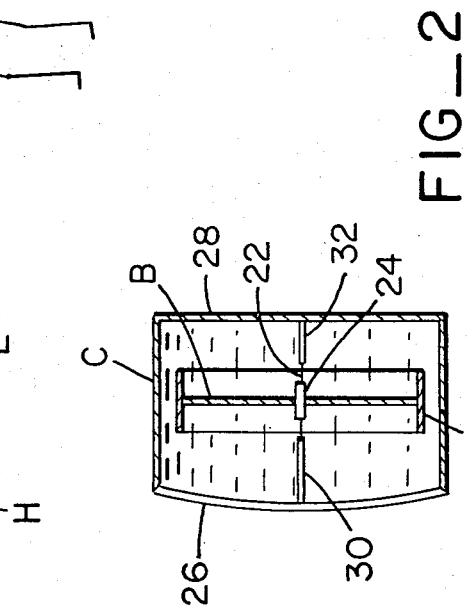
FIG_2
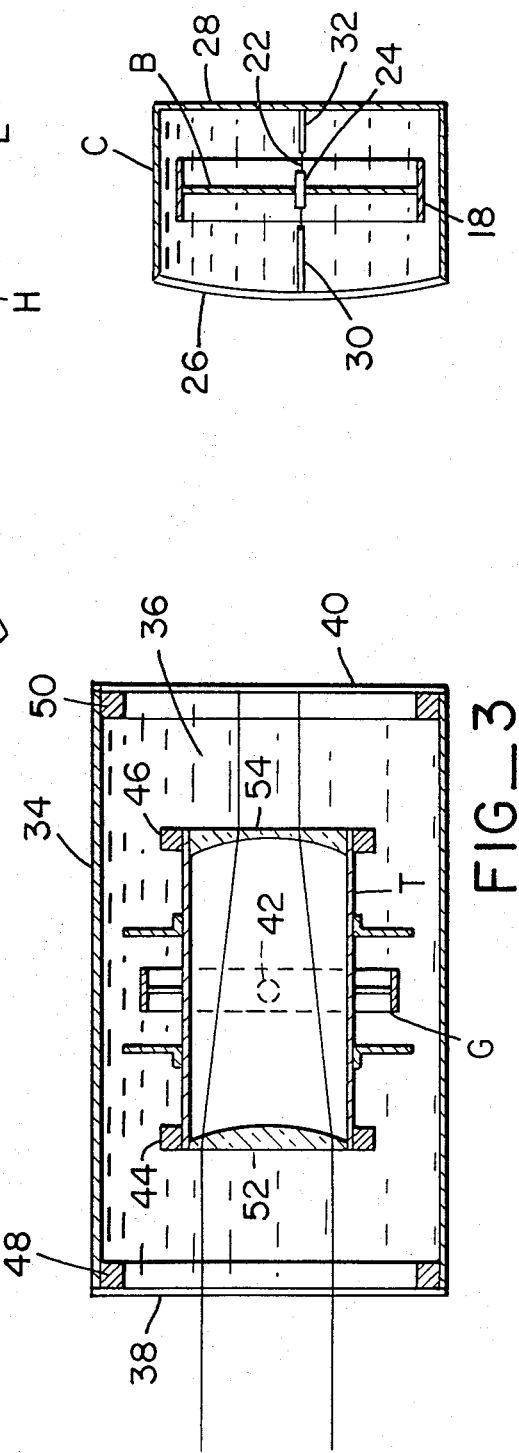
FIG_3

SEMI-LIQUID STABILIZED OPTICES

This is a continuation of application Ser. No. 237,397, filed Mar. 23, 1972, now abandoned.

BACKGROUND OF THE INVENTION

1. Field of the Invention

Many optical systems are subjected to a variety of forces, which tend to move the optical system during observation with resultant degradation of the image. In those instruments providing for large magnification, the image motion degradation is further exaggerated. Where telescopes, monoculars or binoculars are held by hand, substantial oscillation occurs from normal shaking.

Various ways have been tried to stabilize an optical element as a component of an optical device, despite low amplitude oscillatory movement of the housing for the optical element, yet have the optical element move substantially with the housing when the housing is moved in a generally uniform and deliberate fashion to a new position, as in panning. One method has magnets attached to the optical element and to the housing surrounding the optical element to act as a centering or restoring means. However, there is difficulty in establishing an appropriate magnetic field and achieving the desired magnet configuration in practice. This difficulty is compounded by the lack of easy visualization of actual magnetic interactions. Another method has employed springs. However, springs have suffered from requiring adjustment, which is inconvenient in a closed system.

Recently, optical systems such as mirrors and telescopes have been mounted in fluid media for stabilization with additional mechanical support for the optical member.

2. Description of the Prior Art

Copending application Ser. No. 75,965, filed Sept. 28, 1970, now U.S. Pat. No. 3,711,178, issued Jan. 16, 1973, discloses a fluid stabilized mirror.

SUMMARY OF THE INVENTION

Optical elements are stabilized against vibrational movement and resulting distortions by supporting an optical element or system in a transparent semi-liquid or gel. The optical element is neutrally supported by the buoyant forces of the semi-liquid or gel and may be additionally supported by other cooperative means, e.g., mechanical means. The optical element is constructed with buoyant members, so as to have the center of floatation and center of gravity of the optical element coincident with the support axis for the element. The semi-liquid or gel is achieved by adding a small amount of a thickening agent ot an optically transparent fluid to provide a fluid having the desired shear properties.

BRIEF DESCRIPTION OF THE DRAWINGS

FIG. 1 is a perspective schematic view of a stabilized telescope in which the stabilizer is located optically adjacent to the objective and a portion of the housing of the stabilizer is cut away;

FIG. 2 is an enlarged sectional view of a stabilized mirror in accordance with this invention having additional resilient supporting means;

FIG. 3 is a side elevation section of a stabilized telescope according to this invention.

DESCRIPTION OF THE SPECIFIC EMBODIMENTS

Optical elements equipped with appropriate floats so as to have the desired buoyancy are immersed in a semi-liquid or colloid for stabilization against vibrational or oscillational movement. Various optical systems may be stabilized in this manner, including mirrors, simple and complex lenses, prisms, and combinations thereof. The optical system is immersed in the semi-liquid maintained in a housing. The shape of the floats and the shape of the housing interact to provide for stabilization of the optical system.

Various thickening agents may be used with a variety of fluids. The thickening agent will vary with the fluid, depending on whether the fluid is hydrophobic, or hydrophilic. The amount required of the thickening agent will vary with the thickening agent, the fluid being thickened and the desired consistency of the semi-liquid.

Numerous advantages are achieved by employing the semi-liquids as the medium for the optical system. The semi-liquid provides a support, through a buoyant action as in the case of liquids, but a resistance to drift similar to solid support, yet having desirable resiliency. The resiliency can provide a centering function to the supported element of the optical system. In addition, it is found that convective effects resulting from thermal variations between the fluid and the environment which would result in image aberrations are either eliminated or minimized. Furthermore, while the optical device will move from one position to another, the optical system will only go a minor proportion of the oscillatory of vibrational movement which is imparted to the housing, where the amplitude is relatively small.

The semi-liquids respond to different types of movements in different ways. For rapid movements of relatively small amplitude, there are lossy shear forces of the semi-liquid which tend to dampen. Where the system undergoes a change of position, the supportive or gel-like shear forces of the semi-liquid will contribute to help move the optical system to the new position; both of these shear forces in the semi-liquid are able to transmit the movement from the housing to the optical system.

The semi-liquid system is a colloidal solution, normally forming a sol which provides for properties of both a liquid and a solid. The shear forces are such, that the semi-liquid will transmit a steady force over a relatively long distance. In addition, the semi-liquid can be deformed, so as to act as a spring. The semi-liquids are provided by adding a small amount, usually of the order of from about 0.01 to 5 weight percent, more usually of the order of from 0.05 to 2 weight percent, of a high molecular weight material, which is homogeneously distributed throughout the liquid, but forms a structure in the liquid. These high molecular weight materials, therefore, impart solid properties to the colloid.

A large number of thickening agents are known, particularly for hydroxylic systems, e.g., water. These include naturally occurring materials, modified naturally occurring materials, and synthetic materials.

Among the naturally occurring materials are gum arabic, albumin, pectin, glutin, arabinogalactin, and agar.

The modified naturally occurring materials are primarily modified polysaccharides, e.g., celluloses. These include such materials as carboxymethyl cellulose, hydroxyethyl cellulose, the salts of such materials, etc.

The synthetic thickeners are primarily addition polymers having a plurality of carboxylic acid groups, either as the acid or its salts, or condensation polymers based on ethylene oxides. Illustrative polymers include carboxyvinyl polymers such as Carbopol, copolymers of methyl vinyl ether and maleic anhydride, such as the Polyox series.

While for the most part, the thickeners are employed for hydroxylic or polar media, relatively non-polar organic solvents may also be used where a thickener is available providing the desired physical and optical properties, e.g., transparency. Various rubbers, e.g., polybutadiene, or polyisoprene may be used as thickeners for non-polar media, e.g., hydrocarbons.

Various media may be used, both inorganic and organic, and both polar and non-polar. For the most part, the media employed will be polar, and usually hydroxylic, and may be used by themselves or in combination. Illustrative fluids include water, alcohols, ethers, ketones, e.g., acetone, dimethylformamide. dimethylsulfoxide, fluorocarbons, etc. Normally, the density at 20° C will be in the range of about 0.9 – 2, more usually in the range of about 1.0 – 1.5 g/ml. Included in the liquid may be a variety of salts, which may be used to change the properties of the colloid according to known ways.

In order to illustrate exemplary types of system which may employ the semi-liquids, consideration will now be given to the drawings. The first exemplary system is in FIG. 1, which illustrates a telescope with a mirror having no support other than the buoyant and shear forces of the semi-liquid.

The figure is shown as a complex optical system, whereby the mirror is stabilized by the combined inertial action of the mirror assembly and semi-liquid medium. The illustration is concerned with approximately a 20-power optical train. Typically, an objective A is mounted to focus light onto stabilized mirror B within chamber C. The stabilized light is retrodirected from mirror B onto inverting mirrors D, where the light is subsequently imaged at plane E and viewed through eyepiece F. For convenience, negative lens H may be placed in the optic path to extend the focal length.

The telescope comprising lenses A, F, and H is well understood in the art. Without the mirrors B and D, the telescope would invert the images received in both their horizontal and vertical parity. Mirror B functions to fold the light path from lens A backwardly and upon itself. Mirror assembly D serves to displace this light, so that it may be conveniently viewed off the optic path between objective A and stabilized mirror B.

The discussion concerning this optical system in application Ser. No. 75,965, filed Sept. 28, 1970 is incorporated herein by reference.

The stabilized mirror B has a cylindrical housing 12 with a transparent front window 14. The mirror 16 is fitted into a cylindrical float 18. The float structure 18 is of smaller dimension than the housing 12, as to diameter and axial direction, and is of a size where in normal movement of the housing, the float will not contact the walls of the housing. The mirror 16 and float structure 18 are immersed in semi-liquid 20, and positioned so as to be centrally located, with the axis of the mirror superimposed on the axis of the housing at operated temperatures, e.g., ambient temperatures.

The material of the float 18 is chosen so as to be inert to the semi-liquid 20. The size and dimensions of the float 18 are such as to provide a center of gravity and a center of floatability for the mirror float structure on the axis of the housing.

Various materials may be employed for the float structure, such as foamed plastics, plastics, gas-containing tubes, etc. The choice of the float will affect the effect of temperature.

Depending on the fluid employed, changes in density of the fluid by virtue of changes in temperature, will affect the displacement of the mirror structure, or for that matter, any optical structure, which does not have other support than the semi-liquid. Therefore, where the density relationship between the optical system and the semi-liquid changes significantly with changes in temperature, substantial displacement may be encountered. The displacement will be nearly independent of the size of the optical contained in the housing. That is, whether the optical system has its largest dimension in the vertical direction of 1 cm or 100 cm, the amount of displacement will be relatively independent of the size of the optical system for a given stabilization performance. Therefore, a system unsupported by other than the semi-liquid is preferred with relatively large optical systems, so that the amount of displacement is small compared with the size of the optical system.

This can be demonstrated by a relatively simple and rough calculation. The imbalance of a stabilizer which must be supported is comparable to the inertial mass acted on by the restoring force, modified by floatation effects. It is therefore possible to relate stabilizer frequency to the sag the stabilizer will experience as the buoyancy relations change. In particular, the following formula provides a reasonable approximation:

$$\Omega \simeq (gb/h)^{1/2},$$

where $g$ equals gravitational acceleration; $b$ equals buoyance error factor (fraction of mass not supported by hydraulic pressures); and $h$ equals sag distance of the stabilizer; and $\Omega$ represents the natural resonant angular frequency of the moving system.

Taking a typical value for $b$ in water as $2 \times 10^{-4}$ per degree, and assuming a desired value for the frequency $\Omega$ of 0.2 cycles/second, the value of $h$ for a change in temperature of about 20° C will be approximately 3 cm. With a large system, 3 cm could be tolerated.

To avoid the sag problem, various means may be used to maintain the optical system centrally located. One means not shown is mounting the optical system, e.g., mirror, on a bearing mounted on a rod. This allows the mirror to move about the bearing, but prevents the mirror from changing its center, in relation to the axis of the housing.

A second method for centering the optical system is to use an elastic or tension thread 22, as depicted in FIG. 2. Mirror B at the central portion of its disk is pierced, normally by fastened tube 24. Tube 24 in its turn is fastened to elastic thread 22, midway between window 26 and wall 28 Supportive cylinders 30 and 32 enclose the elastic thread 22 to further position the mirror B and arrest mirror sag when thermal fluid density changes occur.

A typical elastic thread which can be used is sold under the trademark ELASTEX, registered trademark of David Traum, Inc. of New York.

In FIG. 3, a telescope is depicted, in which sag is inhibited, and magnetic centering is used in conjunction with the centering from the semi-liquid. A cylindrical housing 34, has telescope T immersed in semi-liquid 36. The housing 34 has front and rear windows 38 and 40 respectively. The telescope T is mounted at point 42 on a gimbal G. The gimbal G prevents sag of the telescope T, so that the center point of the axis of the telescope is on the horizontal axis of the housing. Circular magnets 44 and 46 are mounted forwardly and rearwardly respectively of the telescope T. The housing 34 is provided with circular magnets 48 and 50, which surround the front window 38 and rear window 40 respectively. The front pair of magnets and rear pair of magnets are polarized for mutual attraction, to insure that the telescope maintains a bias towards the windows 38 and 40 and is aligned with a light path passing through the windows. In the event that a very highly resilient semi-liquid is employed, it can be advantageous to reverse the action of the magnets to oppose the centering action of the semi-liquid, and thereby reduce the natural frequency of the optical telescope for improved low frequency stabilization performance.

Upon oscillatory or vibrational movement of the instrument housing, the effect of the movement will be transmitted from the housing through the action of the semi-liquid and the magnets to influence the movement of the telescope T. Furthermore, once the vibration action on the housing has stopped, there will be a very rapid damping of the motion of the telescope, as a result of lossy shear forces in the semi-liquid. The semi-liquid also offers the advantage in providing lubrication of the bearings in the gimbal, as well as any other mechanical connection between an optical system and the housing, involving a bearing or other mechanical connection requiring lubrication.

Various methods may also be employed for repositioning the element, if violent motion has moved the element off axis. For example, retractable arms can be employed which engage a member bonded to the element so as to be able to reposition the element. An arm having retractable fingers could be used which could grip the element to return the element to the original position. Other methods known in the art could also be employed.

Depending on the fluid employed and the conditions under which the optical system is used, provision can be made for gas or vapor formation. The housing or chamber can be provided with bellows, balloon, bubble trap, etc., to accommodate accumulated gases or vapors.

The semi-liquid can be advantageously employed with optical systems where fluids are employed, which are subject to temperature variation. Fluids are frequently employed in optical systems, in which one or more windows are adjustable. Illustrative of such a system is the dynalens employing two windows disposed along a common axis and joined by a bellows. One of the windows is adjustable about a vertical axis and the other about a horizontal axis. Other optical systems employ a single window which is adjustable about both axes. By use of the semi-liquid pluming can be minimized or completely inhibited.

In order to demonstrate the subject invention, a stabilized mirror was fabricated. A cylinder having flat front and rear windows was employed as the housing. The front window was removed, and the housing filled with an aqueous semi-liquid medium. The semi-liquid medium was obtained by dissolving Carbopol 941, a polyvinyl carboxylic acid, available from B. F. Goodrich Co., in a one to one water:ethanol solution, to provide a one weight percent solution. a small amount of diisopropanolamine was added to neutralize the solution. An aliquot of the resulting solution was then diluted in water to provide a 0.1 weight percent solution which had the desired physical properties. A mirror was centrally seated in a low density filled plastic cylinder. The cylinder had about one-half the dimensions of the housing, and was about one-half as long in the axial direction. The mirror was positioned in the center of the housing, so that the axis of the mirror was coaxial with the axis of the housing. The front window was placed in position and the housing sealed.

By holding the mirror, there was no evident displacement of the mirror by the normal vibrational motion resulting from the shaking of the hand. The mirror would follow the movement of the housing as one panned the housing. Only relatively violent agitation would move the mirror from its position.

The effect of external heat on the semi-liquid was also investigated. Ordinary water was used as a control sample. In the first test, a localized heat source was used at a power level of about ⅓ watt. The sample under consideration had a concentration of 0.05 weight percent Carbopol 941. With the water, there was an evident pluming effect, was evidenced by the refractive index differences, which were visualized by projecting a collimated beam through the cells for a distance of about 10 feet. With the Carbopol solution, however, it was noted that the heat was maintained in a shell of thermal gradient. In effect, refractive index effects were maintained in a small area, without significantly affecting the main body of the fluid.

It is evident from the foregoing discussion, that many advantages are obtained by employing optical systems immersed in a semi-liquid. The semi-liquid provides a supportive function, either by itself, or with various mechanical or magnetic supports. In many instances, this semi-liquid may be used by itself, without ancillary supporting equipment. Where the housing for the optical system is subjected to vibrational or oscillatory motion, the optical system is subjected to proportional motion, and when the forces causing this motion are diminished or stopped, the semi-liquid provides damping of the motion of the optical system. While at the same time providing resilient forces for restoring the optical system to its original position, the semi-liquid is capable of transmitting forces from the housing to the optical system, when the housing is moved from one position to another.

In many embodiments, the semi-liquid is capable of being used in conjunction with mechanical means, such as gimbals, bearings, elastic or resilient threads, etc. or magnetic means, in the aiding in the positioning of the optical system. The semi-liquid is compatible with small and large systems, ancillary devices usually being desirable with small systems.

Because various semi-liquids may be employed, versatility is achieved in designing optical systems. The ability to varying the refractive index of the semi-liquid can be used in varying the effect of refraction on light paths, so as to modify the light paths in known manners. Thus, the semi-liquid can greatly expand the variety of environments in which an optical system may be employed and the uses to which an optical system may be put.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A stabilized optical apparatus comprising: a housing substantially filled with a transparent semi-liquid and having at least one transparent window; and an optical structure immersed in said semi-liquid, wherein said semi-liquid is a colloidal solution thickened by a high molecular weight thickener.

2. A stabilized optical apparatus according to claim 1 wherein said optical structure comprises at least one optical element in light receiving relationship to said window and means for imparting neutral buoyancy to said optical structure.

3. A stabilized optical apparatus according to claim 2 wherein said housing has an axis normal to said optical element and including resilient means along said axis connecting said housing to said optical structure.

4. A stabilized optical apparatus according to claim 2 wherein said housing has an axis normal to said optical element and including bearing connecting means between said housing and said optical element coaxial with the axis of said housing and attached to said optical element at the center of said optical element.

5. An apparatus according to claim 2 wherein said semi-liquid is water containing from 0.01 to 5 weight percent of a thickener.

6. An apparatus according to claim 2 wherein said optical element is a mirror.

7. An apparatus according to claim 2 wherein said optical element is a telescope.

8. An optical apparatus according to claim 2 wherein said semi-liquid is water thickened with an at least partially neutralized polyvinyl carboxylic acid.

9. An optical apparatus according to claim 2 wherein the optical element is coaxial with the axis of said housing.

10. An optical apparatus according to claim 2 wherein said housing has an axis normal to said optical element and said window, said housing has first magnetic means, and said optical structure has second magnetic means polarized for mutual attraction and spatially oriented to bias said optical element in coaxial relation with the axis of said housing normal to said window.

11. An apparatus according to claim 1 wherein said semi-liquid is water containing from 0.01 to 5 weight percent of a thickener.

12. An optical apparatus according to claim 1 wherein said semi-liquid is water thickened with an at least partially neutralized polyvinyl carboxylic acid.

13. A stabilized optical apparatus comprising: a cylindrical casing substantially filled with an aqueous transparent semi-liquid and having at least one transparent window, said casing having an axis normal to said window; an optical structure comprising at least one optical element in light receiving relationship to said window, having a center point on said axis and means for imparting neutral buoyancy to said optical element, wherein said semi-liquid is a colloidal solution having a high molecular weight thickener.

14. An optical apparatus according to claim 13 wherein said aqueous semi-liquid has from 0.05 to 2 weight percent of a thickener.

15. An optical structure according to claim 14 wherein said structure is at least partially neutralized polyvinyl carboxylic acid.

16. An optical structure according to claim 14 wherein said thickener is modified cellulose.

17. An optical apparatus according to claim 13 wherein said optical element is a mirror.

* * * * *